March 19, 1968 R. BRAUM ET AL 3,374,443
PULSE GENERATOR FOR MODULATING A MAGNETRON
Original Filed Sept. 27, 1965
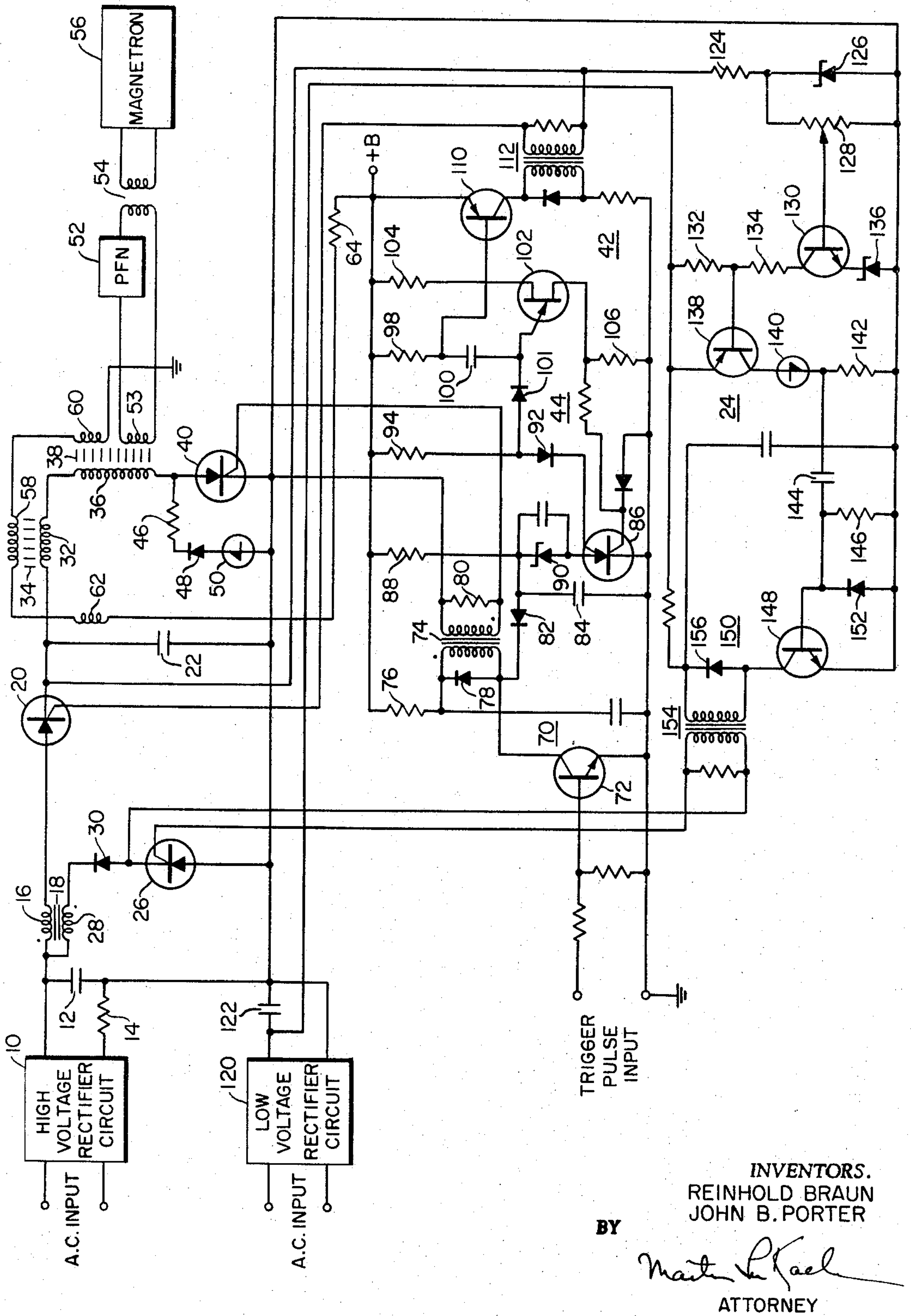
INVENTORS.
REINHOLD BRAUN
JOHN B. PORTER
BY
Martin [signature]
ATTORNEY United States Patent Office 3,374,443
Patented Mar. 19, 1968

3,374,443
PULSE GENERATOR FOR MODULATING A MAGNETRON

Reinhold Braun and John B. Porter, San Diego, Calif., assignors to General Dynamics Corporation, a corporation of Delaware Continuation of application Ser. No. 490,289, Sept. 27, 1965. This application Aug. 24, 1967, Ser. No. 663,166
4 Claims. (Cl. 331—87)

ABSTRACT OF THE DISCLOSURE

A system for developing pulses of a controlled energy content including a charge storage capacitor and means for controlling the charge applied on the capacitor and a discharge circuit which when coupled to the capacitor by means of an electronic switch develops an output pulse of a controlled energy content.

This application is a continuation of application Ser. No. 490,289, filed Sept. 27, 1965, and now abandoned.

The present invention relates to electronic systems and particularly to a system for generating high power pulses.

The invention is especially suitable for use in a radar system for pulsing a magnetron. A system embodying the invention may be termed a magnetron modulator system.

In a magnetron modulator system, a storage device is discharged through a transformer into the magnetron for the purpose of applying an operating pulse thereto. When so pulsed, the magnetron generates a pulse of high frequency energy which may be transmitted by a radar antenna. An electronic switching device is generally used to discharge the storage device. Unless the duration of the discharge and the amount of energy in the discharge pulse are accurately controlled, the magnetron is not properly modulated to generate the desired high frequency pulse. Previous magnetron modulators have been proposed which include systems of circuits for controlling the process of charging and discharging the storage device; however, such systems are not entirely satisfactory, particularly from the point of view of efficiency and reliability of operation. It is often desired that the magnetron modulator system be packaged in a relatively small space, such that the modulator as well as the rest of the radar system in which it is incorporated may be mounted in the limited amount of space normally available in modern aircraft. To this end, bulky parts, such as tubes and large inductors, are undesirable.

Accordingly, it is a principal object of the present invention to provide an improved pulse generation system especially suitable for use in a radar system.

It is another object of the present invention to provide an improved pulse modulator especially adapted for use with magnetrons and like devices, which makes efficient use of available power.

It is a further object of the present invention to provide an improved magnetron modulator system which is adapted to be packaged in a small area.

It is a still further object of the present invention to provide an improved high power pulse generation system in which the energy content of the pulse output therefrom is accurately controlled.

It is a still further object of the present invention to provide an improved pulse modulator circuit which is reliable in operation and makes extensive use of solid state devices.

It is a still further object of the present invention to provide an improved pulse modulator circuit which is reliable in operation and is protected against breakdown.

It is a still further object of the invention to provide a pulse modulator which is much improved over conventional thyratron modulators in that the need for periodic replacement of thyratrons or like devices is eliminated and also in that the output pulses produced may readily be regulated.

Briefly described, a pulse generator system embodying the invention includes a storage device, such as a capacitor, arranged in circuit with a first electronic switching device for controlling the discharge thereof. A saturable reactor is connected in circuit with the electronic switching device and the capacitor for controlling the discharge cycle of the device whereby the energy resulting from the discharge can be transferred in a controlled or regulated power pulse to a magnetron or like device for purposes of the modulation thereof. A second electronic switching device is arrayed in circuit with the capacitor and a source of charging energy so as to control the capacitor charging cycle. Also arranged in circuit with the capacitor is a circuit for sensing the charge level thereof for operating the second switching device and thereby controlling the charge stored in the storage device. Inasmuch as regulation is accomplished by controlling the charging and discharging of the storage device accurately, the drain on the power source is minimized, and efficient power conversion is obtained. The switching devices may be silicon controlled rectifiers and similar solid state devices. The other active components in the system are also magnetic or solid state elements, thereby enhancing the reliability of the system and the capability of the system to be packaged in a small space.

The invention itself, both as to its organization and method of operation, as well as additional objects and advantages thereof, will become more readily apparent from a reading of the following description in connection with the accompanying drawing in which the sole figure is a diagram, partially schematic and partially in block form, of a magnetron pulse modulator system embodying the invention.

Referring more particularly to the drawing, there is shown a high voltage rectifier circuit 10 which rectifies input voltages from an alternating current supply such as the power lines or a generator. In the event that a three-phase supply is used, the high voltage rectifier may include silicon controlled rectifiers (SCR's) in each of the phases of the supply, which SCR's are triggered at a rate much higher than the frequency of the alternating current applied thereto. The rectified direct current output from the supply is applied across a filter capacitor 12 and a resistor 14, which are connected in series with each other. The resistor is desirably a power resistor and senses the current which is delivered by the rectifier circuit 10. A protective circuit may be used to sense any extremes in this current for turning off the trigger to the SCR's in the circuit 10, thereby interrupting the output therefrom. The junction of the resistor 14 and the capacitor 12 also provides a floating ground for the pulse generator circuits of the system.

The direct current voltage across the capacitor 12 is applied through a winding 16 of a transformer 18 and an electronic switch provided by a SCR 20 to charge a storage device provided by a storage capacitor 22. The SCR 20 is controlled by a circuit for sensing the voltage level (the charge level) across the storage capacitor 22. This sensing circuit 24 has input terminals which are connected across the capacitor 22 (viz., between the junction of the capacitor 22 and the SCR 20 and floating ground). The output terminals of the sensing circuit 24 are connected between the gate and cathode electrodes of another SCR 26. Another winding 28 of the transformer 18 is connected in series with the SCR 26 and a diode 30. The SCR 26, transformer 18 and the filter capacitor 12 operate to control the SCR 20, which in turn controls the charge cycle of the storage capacitor 22, as will be explained more fully hereinafter.

A winding 32 of a saturable reactor 34, a winding 36 of a saturable transformer 38 and another SCR 40 are connected in series across the storage capacitor 22. The gate electrode of the SCR 40 and the gate electrode of the charge control SCR 20 are both connected to a trigger circuit 42 which receives a trigger pulse input, for example, from the radar system in which the illustrated magnetron modulator is included. The trigger circuit also includes a delay circuit 44 which provides the trigger pulse to the gate electrode of the charge control SCR 20 after a period of time sufficient to insure the delivery of the power pulse.

A protective circuit, including a resistor 46, a diode 48 and a Shockley diode 50, is connected across the SCR 40. The reverse voltage across the SCR 40 is applied by way of the resistor 46 and the diode 48 across the Shockley diode 50. The Shockley diode becomes conductive or breaks down when this reverse voltage approaches the rating of the SCR 40 and inserts the protective resistor 46 effectively across the SCR 40, thereby preventing damaging reverse current from flowing through the SCR 40.

The saturable core transformer 38 has an output winding 53 which is connected to a pulse forming network 52 which may be an artificial transmission line. The output of the pulse forming network is connected to a high voltage pulse transformer 54 which supplies a high voltage output pulse resulting from the discharge of the storage capacitor 22 to a magnetron 56. Filament current for the magnetron may be supplied through the windings of the transformer 54 from the AC input supply if desired.

The saturable reactor 34 has a reset winding 58 which is connected in series with a reset winding 60 of the saturable core transformer 38, choke 62 and a current limiting resistor 64 to a source of operating voltage indicated at +B. This source of operating voltage may be a low voltage rectifier circuit which is powered by the AC input lines. The output of this supply may be referred to chassis ground. The direction of current flow through the reset windings 58 and 60 is opposite to the direction of current flow through the input windings 32 and 36 of the reactor 34 and the transformer 38 respectively. Also, the current through these reset windings is limited by the resistor 64 as well as the internal resistance in the windings and in the choke 62. When the discharge current through the windings 32 and 60 is terminated at the end of a power pulse, the reset current to the windings 58 and 60 is sufficient to cause the reactor 34 and the transformer 38 to become reset to their oppositely saturated states.

Operation of the pulse modulator system is initiated when the trigger pulse is applied to the input of the trigger circuit 42. The pulse is first amplified in a pulse amplifier 70, including a transistor 72 which has the primary winding of a pulse transformer 74 in the collector circuit thereof. Operating power from the source at +B is applied by way of a resistor-capacitor decoupling network 76 which is connected to the primary winding of the transformer 74. A diode 78 is connected across the primary winding of the transformer 74. Pulses which are positive with respect to chassis ground are suppressed, and only the amplified trigger pulses are translated by the transformer 74 and appear at the output winding thereof. A load resistor 80 is connected across the output winding of the transformer 74 and the output winding is connected between the cathode and the gate electrode of the discharge control SCR 40.

The sense of the windings of the transformer 74 and the connections thereto are such that the amplified trigger pulses which are applied to the gate electrode are positive with respect to the cathode of the SCR 40. When the SCR receives an amplified trigger pulse, the SCR is triggered and the capacitor 22 is discharged through the SCR 40.

The duration of the discharge and therefore the length of the discharge pulse depends upon the level to which the storage capacitor 22 is initially charged and the saturation characteristics of the saturable reactor 34 and the saturable transformer 38. The latter follows from the fact that the time for a saturable core device to saturate depends upon the amplitude of the current flowing therethrough and also that the SCR cuts off or becomes nonconductive when the voltage thereacross drops below its sustaining potential.

For a time (say 1 μs.) after the SCR 40 is triggered, the saturable reactor 34 blocks current flow to the SCR 40 so as to allow the SCR 40 to become fully saturated (viz. conductive). The reactor 34 then saturates and current flows through the SCR 40 and the saturable transformer 38 which acts as a pulse transformer. The charge from the capacitor 22 is then transferred by transformer action to the pulse forming network 52. When the capacitor 22 is discharged, the SCR 40 opens. The network 52 then impresses a voltage upon the output winding 53 of the transformer 38, and after a time (say 1 μs.) the transformer 38 saturates and the network 52 may discharge, thereby delivering a high voltage power pulse (say about 2000 volts) through the pulse transformer 54 to the magnetron 56. The saturable transformer acts, in effect, like a switch to discharge the network 52 and aids in generating power pulse with a steep leading edge.

Returning to the trigger circuit 42, it will be observed that an output pulse from the collector of the transistor 70, which is negative with respect to chassis ground, is coupled by way of a diode 82 to the delay circuit 44. The circuit amplifies and delays the trigger pulse (80 μs. in the illustrative circuit). Also the circuit prevents spurious triggering of the SCR 20 by insuring that only one output trigger is generated for each input trigger. A capacitor 84, which is connected between the anode of the diode 82 and ground stretches the pulse which is transmitted through the diode.

The delay circuit 44 includes a silicon controlled switch (SCS) 86, to which operating voltage is applied from the source at +B by way of a resistor 88 and a zener diode 90. The zener diode is bypassed by a capacitor which suppresses transients and filters the voltage which is applied to the SCS 86. A positive voltage with respect to ground is applied to the anode gate electrode of the SCS 86 from the source at +B by way of a diode 92 and a resistor 94 so that the switch 86 is biased to conduct, when a positive trigger pulse is applied to its cathode gate electrode. Such a positive trigger pulse is developed by means of a uni-junction transistor 102 and a charging circuit including a resistor 98 and a capacitor 100, which are connected between the source at +B and the gate electrode of the uni-junction transistor 102. When the capacitor 100 discharges to the threshold voltage of the uni-junction transistor 102, the uni-junction transistor 102 triggers, and current flows from +B to ground through a resistor 104 which is connected to one output electrode of the uni-junction transistor 102, the uni-junction transistor itself and through another resistor 106, which is connected between the other output electrode of the uni-junction transistor 102 and ground. The voltage pulse developed across the resistor 106 is applied to the cathode gate electrode of the SCS 86 and causes that switch to conduct. Before the transistor conducts and before the trigger pulse occurs the SCS 86 is conducting. Thus the diode 92 is conductive and the control electrode is kept close to ground and cut off. The small drop across the diode 92 is insufficient to permit the uni-junction transistor 102 to conduct. The capacitor is connected to +B by way of the resistor 98 and discharged.

When the uni-junction transistor 102 conducts, another discharge path for the capacitor 100 is established between the gate electrode and the output electrode of the uni-junction transistor which is connected to the resistor 106. This results in a voltage drop across the resistor 98.

The base of a transistor 110 is connected to the junction of the resistor 98 and the capacitor 100. Due to the drop across the resistor 98 which takes place upon triggering of the uni-junction transistor 102, a negative voltage is applied to the base of the transistor 110 which causes that transistor, since it is a PNP type, to conduct. The transistor 110 rapidly saturates and a current pulse results which flows through the primary winding of a transformer 112. The secondary winding of this transformer 112 is connected between the cathode and gate electrodes of the charge control SCR 20 and triggers that SCR so that charging current may flow from the high voltage rectifier circuit to charge the storage capacitor 22.

The delay cycle in the circuit 44 is initiated upon occurrence of the negative pulse from the trigger pulse amplifier 70. The diode 82 conducts, and the voltage at the anode of the SCS 86 drops, thereby causing it to cut off. The charged capacitor 100 then begins to discharge through the path including the resistor 94, the resistor 98 and the diode 101. After the circuit delay time, the capacitor discharges to the threshold voltage of the uni-junction transistor 102. The uni-junction transistor then conducts, providing the alternate discharge path for the capacitor 100 through the uni-junction and through the resistor 104. A negative pulse is developed at that instant which triggers the transistor 110. At the same time the current flows through the uni-junction transistor 102 and a positive pulse appears across the resistor 106, which triggers the silicon controlled switch 86 back into conduction, and allows the capacitor 100 to recharge, thereby cutting off the uni-junction transistor 102. The next trigger pulse which occurs re-starts the delay cycle. The pulse produced by the triggering of the transistor 110 is delayed by the delay time of the delay circuit 44 as determined by the time constant of the charging circuit including the resistor 98 and the capacitor 100.

In order to control the energy in the modulating pulse which is produced when the discharge controlled SCR 40 is triggered, the voltage level to which the storage capacitor 22 is charged, after the charge control SCR 20 is triggered, is detected or sensed by the voltage sensor circuit 24. This circuit is operated by voltage produced by a low voltage rectifier circuit 120 which may include a transformer and a full wave diode rectifier. This rectifier circuit 120 is referenced to floating ground, and a filter capacitor 122 is connected between the output of the rectifier circuit and floating ground. Floating ground is used as a reference for the voltage sensor 24 inasmuch as the voltage sensor senses the voltage across the storage capacitor 22, one end of which is also referred to floating ground. Accordingly, variations in the operating voltage to the voltage sensor 24, due to supply variations affecting the low voltage rectifier 120, do not affect the voltage which is sensed by the sensor circuit 24.

A resistor 124 and a zener diode 126 are connected across the storage capacitor 22. The zener diode 126 provides protection against voltage variations across the capacitor which might damage the transistors in the voltage sensor circuit 24. Potentiometer 128 is connected in series with the resistor 124 and supplies the voltage which is sensed, suitably attenuated, to the base of a transistor 130. This transistor 130 receives operating voltage from the low voltage rectifier circuit 120 through a pair of resistors 132 and 134. The emitter of the transistor 130 is maintained at a reference voltage by means of a zener diode 136. When the positive voltage exceeds the reference level set by the zener diode 136, the transistor 130 conducts, and a negative-going output voltage is applied to the base of another transistor 138. The collector-to-emitter path of this transistor 138, which is of the PNP type, is connected in series with a Shockley diode 140 and a resistor 142. A small negative-going voltage applied to the base of the transistor 138 drives that transistor into saturation and causes the full supply voltage to appear across the Shockley diode 140, which breaks down almost instantaneously so that a sharp positive pulse with respect to floating ground appears across the resistor 142. This sharp positive pulse is further sharpened by a differentiating circuit, including a capacitor 144 and a resistor 146. Only the positive pulses from this differentiating circuit are applied to the base of a transistor 148, which is part of a transistor amplifier 150. A diode 152, across the resistor 146 clips any negative-going pulses which are produced by the differentiating circuit. The positive pulses are amplified by the amplifier 150, which includes a transformer 154 in the collector circuit thereof. A diode 156 across the primary winding of the transformer 154 insures that negative pulses are suppressed. The transformer 154 delivers trigger pulses to the SCR 26 in the charge control circuit for the SCR 20.

It will be observed that the winding 16 of the transformer 18 and the storage capacitor 22 form a resonant charging circuit so that the voltage across the storage capacitor 22 approaches twice the voltage across the filter capacitor 12. The voltage across the diode and the SCR 26 is therefore negative with respect to floating ground. Thus, when the SCR 26 is triggered, current flows through the winding 28 in a direction to produce a voltage across the winding 16 which brings the total voltage across the SCR 20 below its sustaining voltage. The SCR 20 cuts off and the charging of the storage capacitor 22 is terminated.

From the foregoing description it will be apparent that there has been provided an improved power supply circuit especially suited for use as a magnetron modulator. By virtue of saturable reactor control which is operative during the discharge cycle of the pulse forming network 52 and the charge level sensing circuits which are operative during the charge cycle of the storage capacitor, the pulses which are delivered to the magnetron, have uniform energy content and permit consistent operation of the magnetron with a minimum of frequency variation. While a preferred embodiment of the invention in a magnetron modulator system has been described, it will be appreciated that variations and modifications in and other uses of the invention within the scope thereof will become apparent to those skilled in the art. Accordingly, the foregoing description should be considered merely as illustrative and not in any limiting sense.

What is claimed is:

1. A magnetron modulator system adapted to derive pulses of controlled energy content each in response to an input signal and provide said pulses to a magnetron type device comprising (a) a storage capacitor, (b) a discharge circuit coupled across said storage capacitor, including a first SCR and a saturable core transformer connected in series with each other, (c) a charging circuit coupled across said capacitor, including a second SCR and a source of operating voltage connected to said capacitor, (d) means coupled to said capacitor for sensing the voltage across said capacitor and when said capacitor voltage exceeds a predetermined level providing an output pulse in response thereto to said second SCR for disconnecting said charging circuit from said capacitor, (e) a pulse forming network coupled to said transformer, (f) means responsive to said input signal for triggering said first SCR switch to discharge said network through said saturable core transformer whereby to produce a power pulse, (g) means for triggering said second SCR a predetermined time after said first SCR is triggered, and (h) means for coupling said network to said magnetron for delivering said power pulse thereto.

2. The invention as set forth in claim 1, wherein said voltage sensing means includes a transformer having a winding connected to said second SCR and another winding connected to a third SCR, means electrically connected to said capacitor for generating a pulse when the voltage across said storage capacitor exceeds a pre-determined voltage and for applying said output pulse to said third SCR, said third SCR in response to said output pulse develops a pulse for said second SCR thereby terminating the charging of said storage capacitor.

3. A pulse generator system for deriving a pulse of a controlled energy content in response to an input signal comprising (a) a source of energy,
(b) a charge storage device,
(c) a discharge circuit connected across said storage device and including a first electronic switch and a saturable core transformer connected in series with each other,
(d) pulse forming means coupled to said transformer,
(e) a charge circuit coupled to said energy source and said charge storage device and including a second electronic switch, and means for sensing the voltage across said device for operating said second electronic switch to disconnect said charge storage device from said energy source, and
(f) means responsive to said input signal for operating said first electronic switch to discharge said storage device through said saturable core transformer to produce an output pulse of a controlled energy content.

4. The invention as set forth in claim 3 including means for actuating said second electronic switch to connect said storage device to said energy source after said output pulse is produced.

References Cited

UNITED STATES PATENTS

| | | | |
|---|---|---|---|
| 2,764,684 | 9/1956 | Mayer | 331—87 X |
| 2,853,608 | 9/1958 | Smith et al. | 331—87 X |
| 3,124,740 | 3/1964 | Corey et al. | 331—113 |

ROY LAKE, *Primary Examiner.*

S. H. GRIMM, *Assistant Examiner.*